(12) United States Patent
Allison, Jr. et al.

(10) Patent No.: US 7,413,390 B1
(45) Date of Patent: Aug. 19, 2008

(54) CARGO ANCHORING SYSTEM AND ASSOCIATED METHOD

(76) Inventors: Thomas Allison, Jr., P.O. Box 1915, Las Cruces, NM (US) 88004; Laurie Lynk, 2120 S. Slate St., Deming, NM (US) 88030

( * ) Notice: Subject to any disclaimer, the term of this patent is extended or adjusted under 35 U.S.C. 154(b) by 0 days.

(21) Appl. No.: 11/804,373

(22) Filed: May 19, 2007

Related U.S. Application Data

(60) Provisional application No. 60/802,599, filed on May 23, 2006.

(51) Int. Cl.
*B60P 7/08* (2006.01)
(52) U.S. Cl. .................. 410/102; 410/106; 410/108; 410/115; 410/116
(58) Field of Classification Search .................. 410/56, 410/102, 104, 106, 108, 110, 115, 116; 280/495, 280/423.1, 433; 24/265 CD, 115 K; 248/499
See application file for complete search history.

(56) References Cited

U.S. PATENT DOCUMENTS 6,666,635 B2 * 12/2003 Holt et al. .................. 410/115

* cited by examiner

*Primary Examiner*—Stephen Gordon

(57) ABSTRACT

A cargo anchoring system includes anchor rings with an opening formed therein. Each ring has a tongue monolithically formed with an outer perimeter thereof and extending outwardly therefrom. Each tongue has planar top and bottom surfaces respectively oriented perpendicular to a central axis of a corresponding one of the ring openings. Each tongue has an aperture formed therein. Each of a plurality of bars has a groove formed in an outer surface thereof and penetrates through corresponding ones of the apertures of the tongues. A plurality of cotter pins engages corresponding ones of the grooves and prevents the bars from separating from the tongues. A plurality of rails is connected to the rings and the existing vehicle. An anchor plate, including a hitch ball, is coupled to inner surfaces of the rails and centrally positioned therebetween.

12 Claims, 6 Drawing Sheets

US 7,413,390 B1

CARGO ANCHORING SYSTEM AND ASSOCIATED METHOD

CROSS REFERENCE TO RELATED APPLICATIONS

This application claims the benefit of U.S. Provisional Application No. 60/802,599, filed May 23, 2006, the entire disclosure of which is incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to anchoring systems and, more particularly, to a cargos anchoring system and associated method for assisting a user to anchor cargo inside an existing vehicle or anchor safety chains to the existing vehicle.

2. Prior Art

Pickup trucks are the vehicle of choice for contractors, tradesmen, and farmers and are extensively used for transporting virtually anything. Government officials say trailer use has been rising as the popularity of light trucks has increased in the last decade. A wide variety of trailers are available to fit every need and come in a wide variety of sizes. Many trailers are equipped with a weight-carrying hitch that bears a resemblance to the neck of a goose. This type of hitch system distributes the tongue weight of the trailer to all wheels of the towing vehicle and trailer. A weight-carrying hitch attaches to the towing vehicle using the frame or truck bed to support the trailer's tongue weight at the hitch ball.

One prior art example shows a utility rail which may be used independently or as a mounting rail for a utility rack for pick-up truck cargo beds and the like with the rail. The rack is mounted with two present invention rails to cargo bed walls. Each rail has an elongated member having a generally L-shaped cross-section with a vertical segment and a horizontal segment, each segment having inside walls and outside walls. At least one elongated holding slot such as a cargo anchor T-slot running along at least a portion of the outside wall of either or both the vertical segment and the horizontal segment and locating grooves or starter holes located on either the horizontal segment or the vertical segment for penetrating said elongated member with a plurality of attachment devices for attaching said rail to a structure. The elongated member may also contain one or more hollows designed to add strength to the structure and conserve materials. The rails of the present invention are preferably uni-structurally formed elongated members of extruded metal or plastic or combinations of metallic and non metallic materials. Unfortunately, this prior art example is only designed for use in securing cargo and is not designed for securing safety chains to a towed trailer.

Another prior art example shows a cargo anchor primarily intended for attachment to the upper edge of the side of an open bed truck, comprising a journal box and an integral clamping apparatus. The journal box comprises a base member, a cleat superimposed on the base member and screws for interconnecting the cleat to the base member. A transverse bore in at least one of either the base member or the cleat is disposed parallel to the base member and the cleat and is sized to carry a shaft or a "D" ring that functions to support load binding straps or ties. Integral with the journal box is a clamping device for attaching the journal box to a flat structural member. Unfortunately, this prior art example is complicated to use, and damages the paint surface of an existing truck bed during installation procedures.

Accordingly, a need remains for a cargo anchoring system and associated method in order to overcome the above-noted shortcomings. Such a system is convenient to use, lightweight yet durable in design, and assists a user to anchor cargo inside an existing vehicle or anchor safety chains to the existing vehicle. The strong anchor points of the system provide an easy solution for attaching trailer safety chains, and provides anchor points for chain hooks and tie down ropes to restrain loose materials in truck beds, thereby preventing items such as lumber from sliding around or falling out. The system installs and removes to provide a convenient method of connecting gooseneck trailer safety chains to the hitch rails. The angled extension rings are an innovation that allows easier usage in tying and securing materials in the truck bed. The present invention is simple to use, inexpensive, and designed for many years of repeated use.

BRIEF SUMMARY OF THE INVENTION

In view of the foregoing background, it is therefore an object of the present invention to provide a system for a cargo anchoring system and associated method. These and other objects, features, and advantages of the invention are provided by a cargo anchoring system for assisting a user to anchor cargo inside an existing vehicle or anchor safety chains to the existing vehicle.

The system includes a plurality of portable anchor rings conveniently provided with a centrally registered opening formed therein. Each of such rings has a tongue monolithically formed with an outer perimeter of the ring and effectively extending outwardly therefrom. Each of such tongues has planar top and bottom surfaces respectively oriented perpendicular to a centrally registered axis of a corresponding one of the ring openings. Each of the tongues is provided with an aperture formed therein, and each of the apertures has a centrally registered axis oriented parallel to the axis of the openings of the rings.

Selected ones of the rings have a plurality of tabs monolithically formed therewith and effectively extending outwardly from the outer perimeter of the selected rings. Such tabs are provided with a plurality of spaced arcuate shoulders advantageously formed along the outer perimeter of the selected rings. The tabs are conveniently spaced from the tongues and further are located diametrically opposite to each other along the outer perimeter of the rings.

The system further includes a plurality of portable curvilinear bars. Each of such bars has a groove formed in an outer surface thereof and further is advantageously sized such that the bars removably penetrate through corresponding ones of the apertures of the tongues respectively. Such a groove effectively extends along an entire circumference of the bar, and is oriented perpendicular to a longitudinal length of the bar. The bar has a first portion registered parallel to the top surface of the rail (herein described below), and further has a second portion extending outwardly from a lateral edge of the rail.

The system further includes a plurality of portable cotter pins. Such cotter pins are advantageously sized to removably and directly engage and maintain continuous contact within corresponding ones of the grooves of the bars. The cotter pins effectively prevent the bars from undesirably and prematurely separating from the tongues of the rings during operating conditions. Each of the bars has a bend formed at a medial point thereof such that the bend and the cotter pins effectively cooperate to advantageously prohibit the bars from exiting the apertures of the tongues and the rails respectively during operating conditions.

The system further includes a plurality of portable rectilinear rails removably connected to the rings and directly attached to the existing vehicle. Each of such rails includes a plurality of openings formed therein. Such openings are equidistantly spaced along an entire longitudinal length of the rails, and each of the openings has a centrally registered axis oriented at a right angle to a longitudinal length of the rails. The bars penetrate through corresponding first and second ones of the openings wherein the grooves remain situated subjacent to a top surface of the rails.

The system further includes a plurality of slots formed in the top surface of the rails and spaced therealong. Each of such slots has a longitudinal length oriented parallel to the longitudinal length of the rails. Each of the slots effectively receives corresponding ones of the tongues of the rings therein such that the respective apertures of the tongues advantageously align with corresponding ones of the first and second openings of the rails so that the bars penetrate through corresponding ones of the apertures of the tongues and the openings of the rails.

The system further includes an anchor plate that has laterally opposed edges directly coupled to inner surfaces of the rails. Such an anchor plate is centrally positioned between the rails and advantageously remains statically affixed thereto. The anchor plate conveniently includes a hitch protruding upwardly from a top surface thereof.

A method for assisting a user to anchor cargo inside an existing vehicle or anchor safety chains to the existing vehicle includes the steps of providing a plurality of portable anchor rings that have a centrally registered opening formed therein. Each of such rings has a tongue monolithically formed with an outer perimeter of the ring and extending outwardly therefrom. Each of the tongues has planar top and bottom surfaces respectively oriented perpendicular to a centrally registered axis of a corresponding one of the ring openings. Each of the tongues is provided with an aperture formed therein.

The method further includes the steps of removably penetrating a plurality of portable curvilinear bars through corresponding ones of the apertures of the tongues respectively. Each of such bars has a groove formed in an outer surface thereof. The steps further include removably and directly engaging a plurality of portable cotter pins within corresponding ones of the grooves of the bars. Such cotter pins prevent the bars from undesirably and prematurely separating from the tongues of the rings during operating conditions. The steps further include removably connecting a plurality of portable rectilinear rails to the rings, directly attaching the rails to the existing vehicle, positioning an anchor plate centrally between the rails, and statically affixing the anchor plate directly to inner surfaces of the rails respectively. Such an anchor plate has a hitch protruding upwardly from a top surface thereof.

The method of removably connecting a plurality of rectilinear rails to the rings includes the steps of penetrating the bars through corresponding first and second ones of a plurality of openings formed in the rails. Such openings are equidistantly spaced along an entire longitudinal length of the rails, and each of the openings has a centrally registered axis oriented at a right angle to a longitudinal length of the rails.

The method of removably connecting a plurality of rectilinear rails to the rings further includes the steps of receiving the tongues of the rings within a corresponding one of a plurality of slots formed in the top surface of the rails and spaced therealong. Each of such slots has a longitudinal length oriented parallel to the longitudinal length of the rails. Each of the tongues is situated within the slots such that the respective apertures of the tongues align with corresponding ones of the first and second openings of the rails so that the bars penetrate through corresponding ones of the apertures of the tongues and the openings of the rails.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
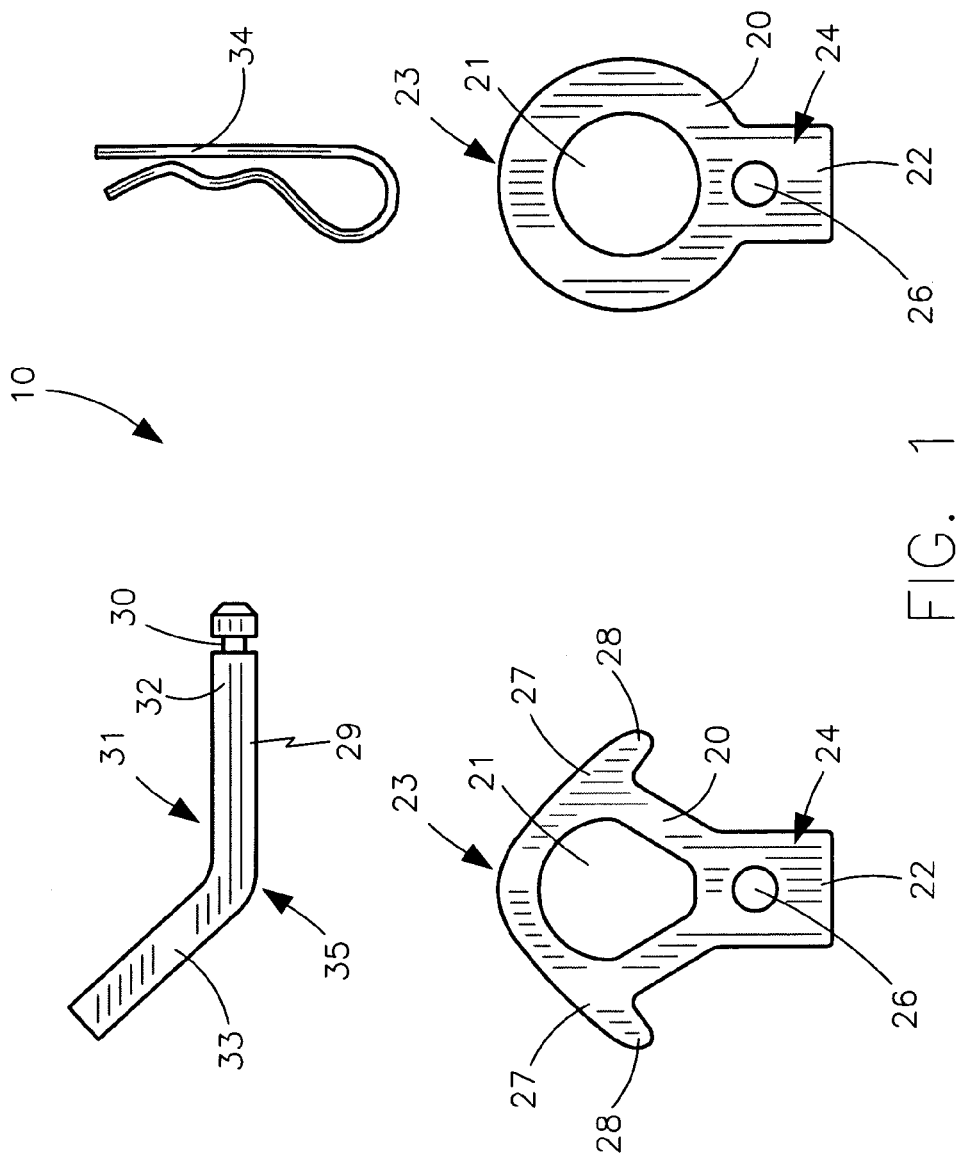
FIG. 1 is a side elevational view of a bar, a cotter pin, and rings respectively, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system and method of this invention is referred to generally in FIGS. 1-6 by the reference numeral 10 and is intended to provide a cargo anchoring system and associated method. It should be understood that the system and method 10 may be used to anchor many different types of cargo in many different types of vehicles and should not be limited in use to anchoring only those types of cargo in those types of vehicles described herein.

Initially referring to FIGS. 1, 2, 3, 4, 5 and 6, the system 10 includes a plurality of portable anchor rings 20 provided with a centrally registered opening 21 formed therein. Each of such rings 20 has a tongue 22 monolithically formed with an outer perimeter 23 of the ring 20 and extending outwardly therefrom. Each of such tongues 22 has planar top 24 and bottom 25 surfaces respectively oriented perpendicular to a centrally registered axis of a corresponding one of the ring openings 21. Each of the tongues 22 is provided with an aperture 26 formed therein, and each of the apertures 26 has a centrally registered axis oriented parallel to the axis of the openings 21 of the rings 20. Such parallel oriented respective axes allow a user to position the rings 20 within the rails 36 (herein described below) for optimal efficiency during operating conditions Referring to FIGS. 1, 2 and 5, selected ones of the rings 20 have a plurality of tabs 27 monolithically formed therewith and extending outwardly from the outer perimeter 23 of the selected rings 20. Such tabs 27 are provided with a plurality of spaced arcuate shoulders 28 advantageously formed along the outer perimeter 23 of the selected rings 20. The tabs 27 are spaced from the tongues 22 and further are located diametrically opposite to each other along the outer perimeter 23 of the rings 20. Such tabs 27 and shoulders 28 respectively allow the user to easily and securely position a cord about the rings 20 without having to make use of the openings 21, thereby increasing the ways the user may employ the invention 10.

Again referring to FIGS. 1 through 6, the system 10 further includes a plurality of portable curvilinear bars 29. Each of such bars 29 has a groove 30 formed in an outer surface 31 thereof and further is advantageously sized such that the bars 29 removably penetrate through corresponding ones of the apertures 26 of the tongues 22 respectively. Such a groove 30 extends along an entire circumference of the bar 29, and is oriented perpendicular to a longitudinal length of the bar 29. The bar 29 has a first portion 32 registered parallel to the top surface 38 of the rail 36, and further has a second portion 33 extending outwardly from a lateral edge of the rail 36. Such a second portion 33 provides a substantial gripping surface for the user when the user penetrates and removes the bars 29 through corresponding ones of the apertures 26 and openings 37 respectively.

Referring to FIGS. 1, 2, 3, 5 and 6, the system 10 further includes a plurality of portable cotter pins 34. Such cotter pins 34 are advantageously sized to removably and directly engage and maintain continuous contact within corresponding ones of the grooves 30 of the bars 29, without the use of intervening elements. The cotter pins 34 prevent the bars 29 from undesirably and prematurely separating from the tongues 22 of the rings 20 during operating conditions. Each of the bars 29 has a bend 35 formed at a medial point thereof, which is essential such that the bend 35 and the cotter pins 34 cooperate to advantageously prohibit the bars 29 from exiting the apertures 26 of the tongues 22 and the openings 37 of the rails 36 respectively during operating conditions. For example, during operating conditions, the bend 35 of the bar 29 prevents the bar 29 from prematurely and undesirably exiting the aperture 26 of the tongue 22 from one side, while the cotter pin 34 simultaneously prevents the same bar 29 from prematurely and undesirably exiting the opposite side of the same aperture 26.

Referring to FIGS. 2, 3, 4, 5 and 6, the system 10 further includes a plurality of portable rectilinear rails 36 removably connected to the rings 20 and directly attached to the existing vehicle 11, without the use of intervening elements. Each of such rails 36 includes a plurality of openings 37 formed therein. Such openings 37 are equidistantly spaced along an entire longitudinal length of the rails 36, and each of the openings 37 has a centrally registered axis oriented at a right angle to a longitudinal length of the rails 36. The bars 29 penetrate through corresponding first and second ones of the openings 37 wherein the grooves 30 remain situated subjacent to the top surface 38 of the rails 36. Such spacing of the openings 37 of the rails 36 allows a user to manipulate the placement of the rails 36 for optimal securing of the cargo depending upon the size and shape of the cargo being anchored.

Figure 2:
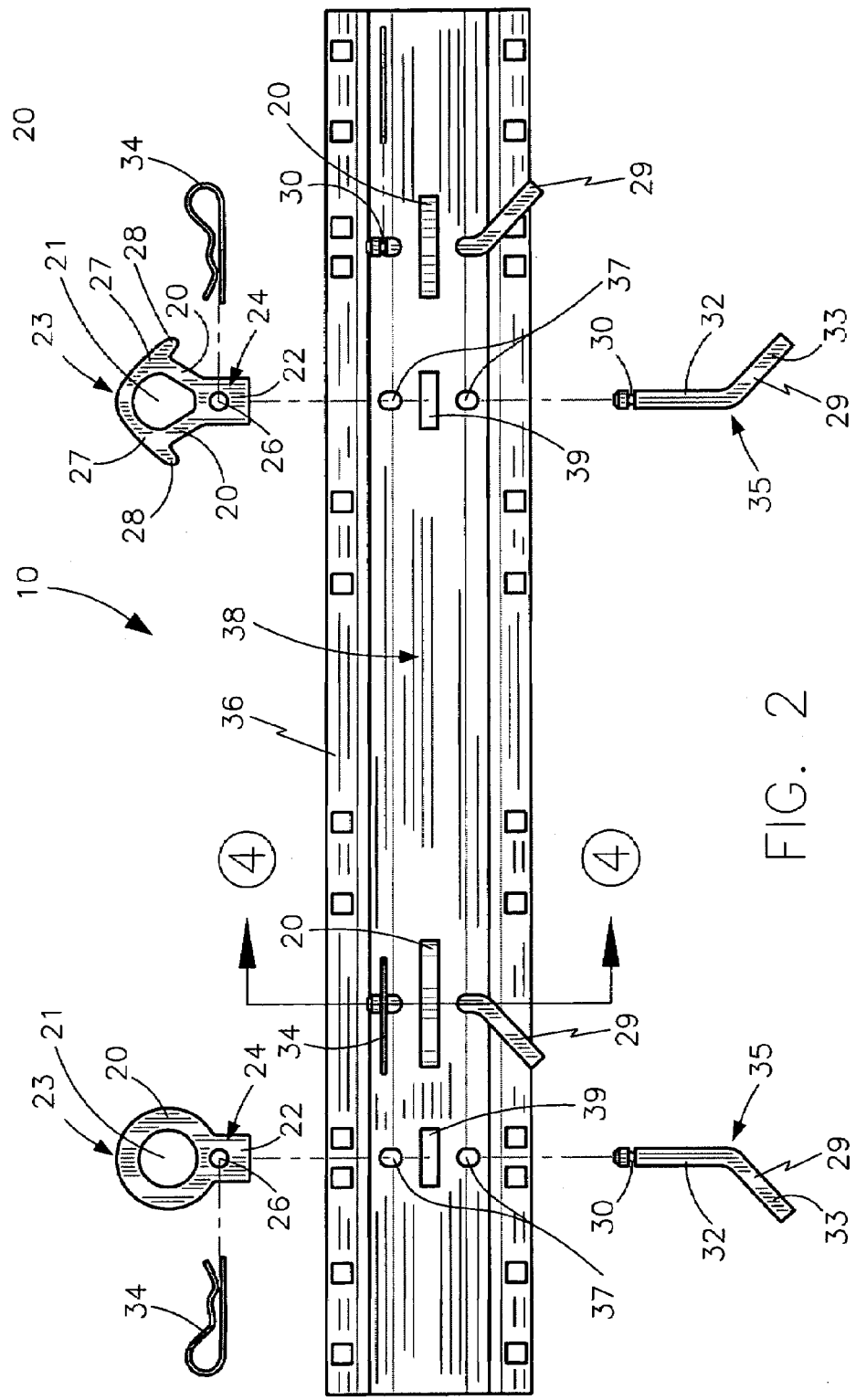
FIG. 2 is a top plan view of the system, and a partial exploded view thereof respectively.
Figure 3:
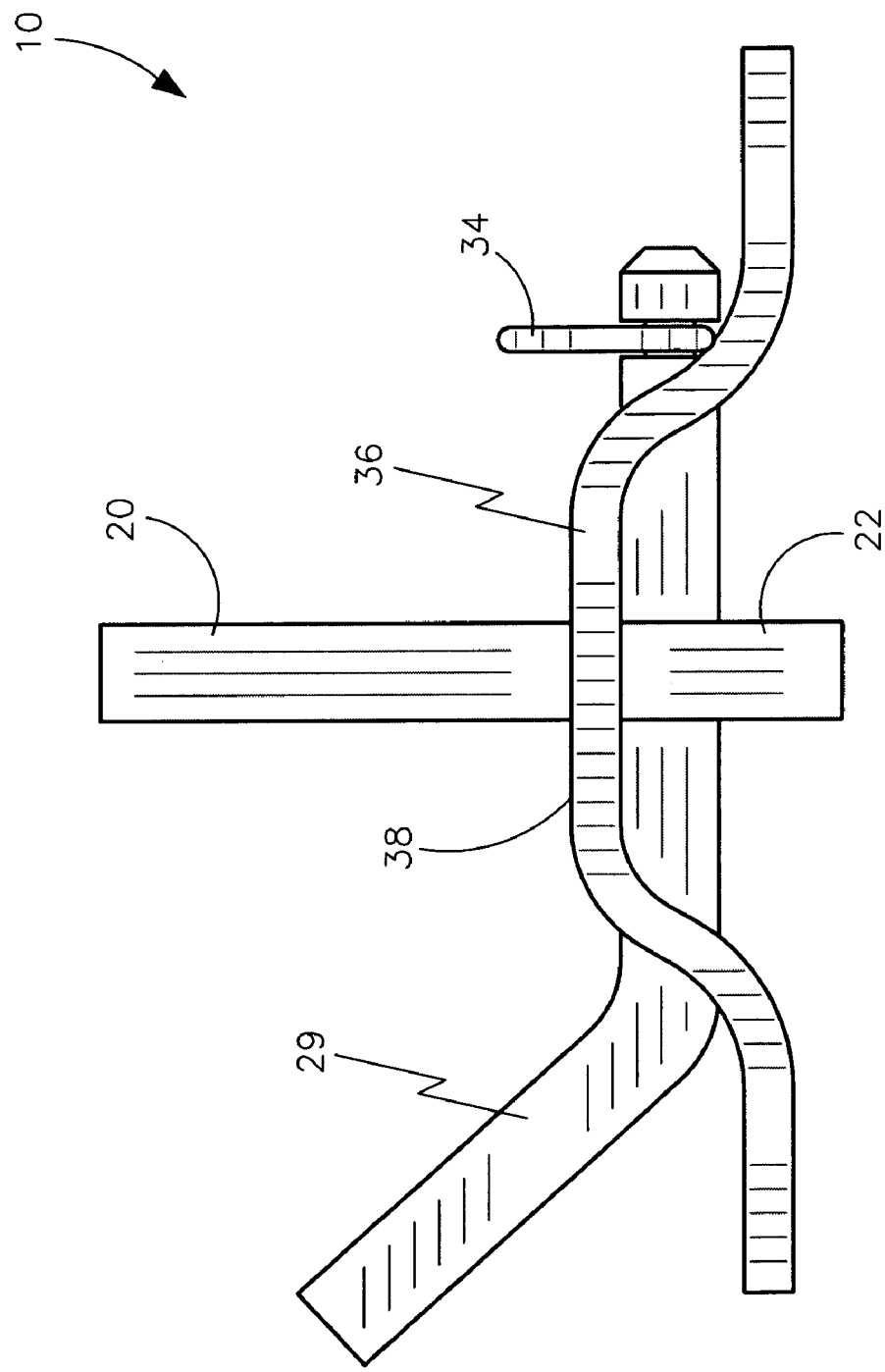
FIG. 3 is a side elevational view of a ring, a bar, a cotter pin, and a rail respectively in the attached position.
Figure 4:
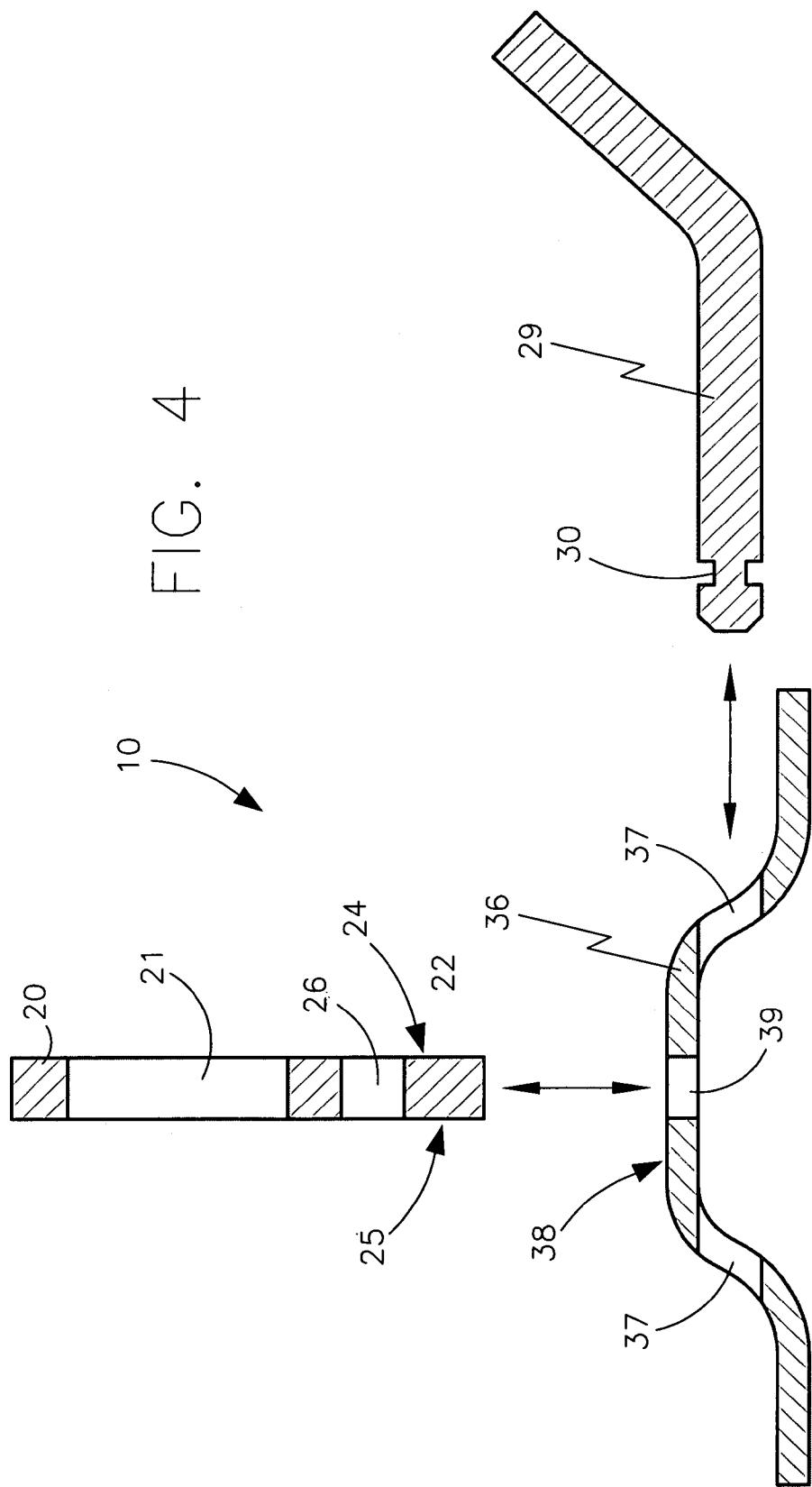
FIG. 4 is a cross sectional view of a ring, a bar, and a rail respectively.

Referring to FIGS. 2 and 4, the system 10 further includes a plurality of slots 39 formed in the top surface 38 of the rails 36 and spaced therealong. Each of such slots 39 has a longitudinal length oriented parallel to the longitudinal length of the rails 36. Each of the slots 39 receives corresponding ones of the tongues 22 of the rings 20 therein, which is crucial such that the respective apertures 26 of the tongues 22 advantageously align with corresponding ones of the first and second openings 37 of the rails 36 so that the bars 29 penetrate through corresponding ones of the apertures 26 of the tongues 22 and the openings 37 of the rails 36. Such spacing of the slots 39 allows a user to place the rings 20 in a multitude of positions based upon the size and shape of the cargo being anchored.

Figure 5:
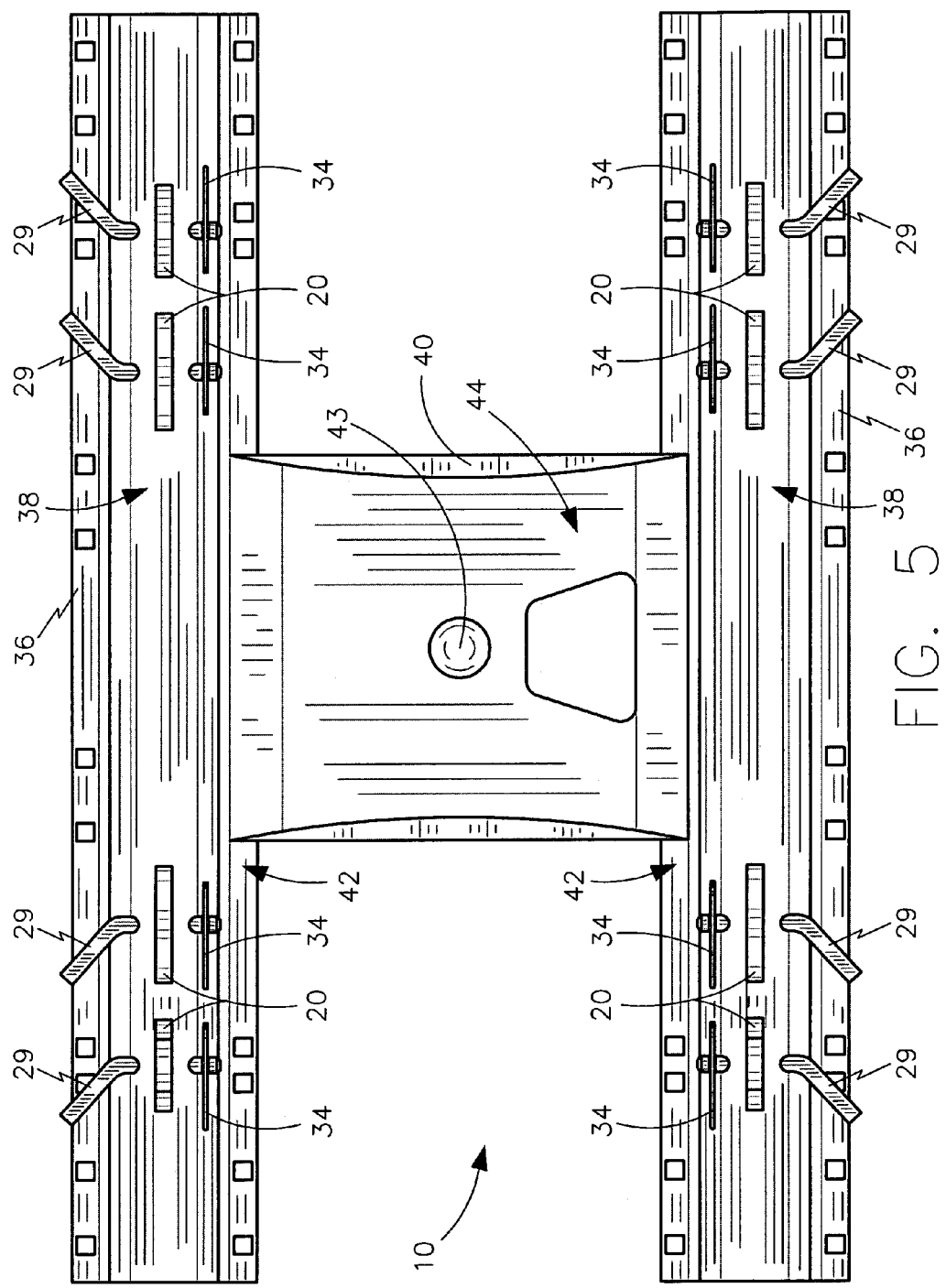
FIG. 5 is a top plan view of the rails attached to the anchor plate.
Figure 6:
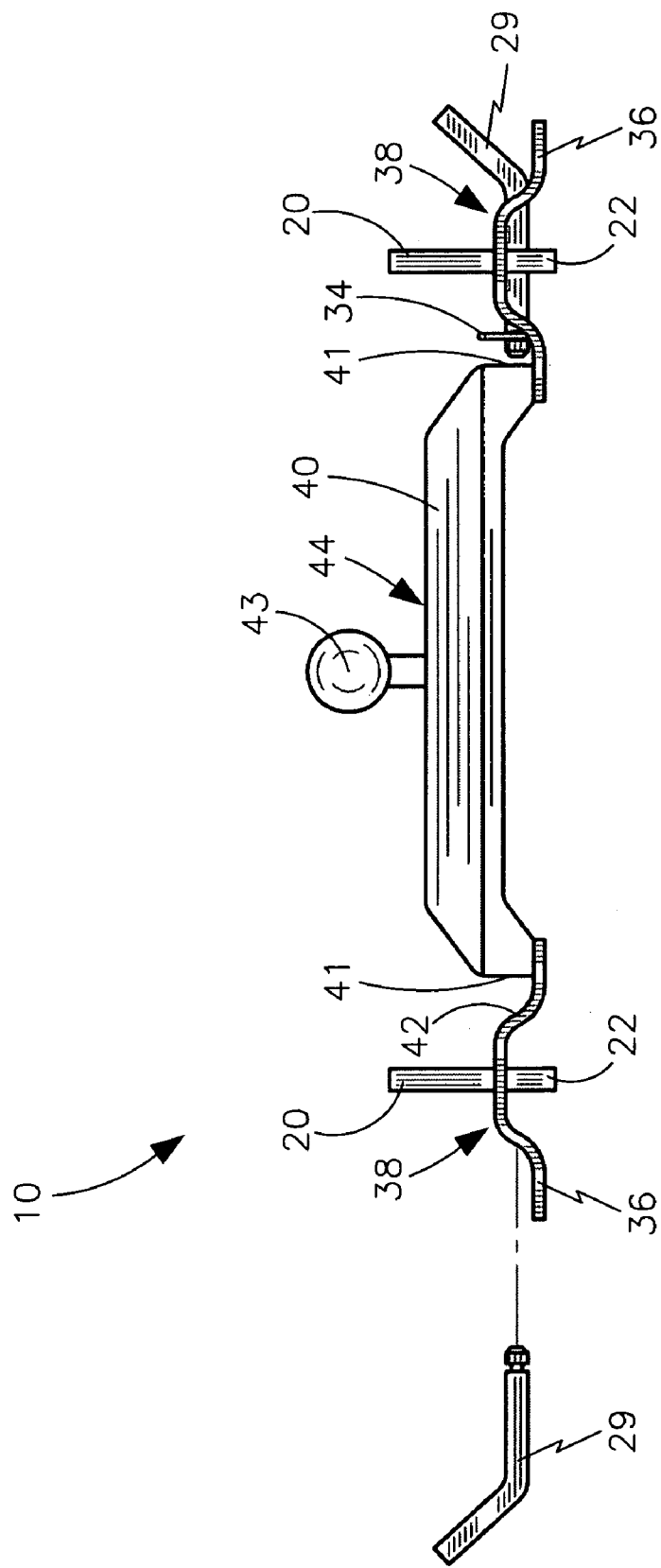
FIG. 6 is a side elevational view of the system shown in FIG. 5, showing one bar removed from the system.

Referring to FIGS. 5 and 6, the system 10 further includes an anchor plate 40 that has laterally opposed edges 41 directly coupled to inner surfaces 42 of the rails 36, without the use of intervening elements. Such an anchor plate 40 is centrally positioned between the rails 36 and advantageously remains statically affixed thereto. The anchor plate 40 includes a hitch 43 protruding upwardly from a top surface 44 thereof. Such an anchor plate 40 allows a user to easily attach an existing trailer to the existing vehicle 11 and secure the safety chains of the trailer to the invention 10 hereby securing the trailer to the existing vehicle 11 during operating conditions.

The portability of the system 10 provides the unexpected benefit of allowing a user to secure cargo within the existing vehicle 11, as well as secure the safety chains of the trailer to the existing vehicle 11 during operating conditions. In addition, the portability of the rings 20 allows a user to position same in a multitude of positions based upon the size and shape of the cargo being anchored. Also, the tabs 27 and shoulders 28 of the rings 20 provide an additional means by which a user can secure cargo in addition to using the openings 21 of the rings 20.

A method 10 for assisting a user to anchor cargo inside an existing vehicle 11 or anchor safety chains to the existing vehicle 11 includes the steps of providing a plurality of portable anchor rings 20 that have a centrally registered opening 21 formed therein. Each of such rings 20 has a tongue 22 monolithically formed with an outer perimeter 23 of the ring 20 and extending outwardly therefrom. Each of the tongues 22 has planar top 24 and bottom 25 surfaces respectively oriented perpendicular to a centrally registered axis of a corresponding one of the ring openings 21. Each of the tongues 22 is provided with an aperture 26 formed therein.

The method 10 further includes the steps of removably penetrating a plurality of portable curvilinear bars 29 through corresponding ones of the apertures 26 of the tongues 22 respectively. Each of such bars 29 has a groove 30 formed in an outer surface 31 thereof. The steps further include removably and directly engaging a plurality of portable cotter pins 34 within corresponding ones of the grooves 30 of the bars 29, without the use of intervening elements. Such cotter pins 34 prevent the bars 29 from undesirably and prematurely separating from the tongues 22 of the rings 20 during operating conditions. The steps further include removably connecting a plurality of portable rectilinear rails 36 to the rings 20, directly attaching the rails 36 to the existing vehicle 11, without the use of intervening elements, positioning an anchor plate 40 centrally between the rails 36, and statically affixing the anchor plate 40 directly to inner surfaces 42 of the rails 36 respectively, without the use of intervening elements. Such an anchor plate 40 has a hitch 43 protruding upwardly from a top surface 44 thereof.

The method 10 of removably connecting a plurality of rectilinear rails 36 to the rings 20 includes the steps of penetrating the bars 29 through corresponding first and second ones of a plurality of openings 37 formed in the rails 36. Such openings 37 are equidistantly spaced along an entire longitudinal length of the rails 36, and each of the openings 37 has a centrally registered axis oriented at a right angle to a longitudinal length of the rails 36.

The method 10 of removably connecting a plurality of rectilinear rails 36 to the rings 20 further includes the steps of receiving the tongues 22 of the rings 20 within a corresponding one of a plurality of slots 39 formed in the top surface 38 of the rails 36 and spaced therealong. Each of such slots 39 has a longitudinal length oriented parallel to the longitudinal length of the rails 36. Each of the tongues 22 is situated within the slots 39 such that the respective apertures 26 of the tongues 22 align with corresponding ones of the first and second openings 37 of the rails 36 so that the bars 29 penetrate through corresponding ones of the apertures 26 of the tongues 22 and the openings 37 of the rails 36.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A cargo anchoring system for assisting a user to anchor cargo inside an existing vehicle or anchor safety chains to the existing vehicle, said anchoring system comprising:
   a plurality of portable anchor rings provided with a centrally registered opening formed therein, each of said rings having a tongue monolithically formed with an outer perimeter of said ring and extending outwardly therefrom, each of said tongues having planar top and bottom surfaces respectively oriented perpendicular to a centrally registered axis of a corresponding one of said ring openings, each of said tongues being provided with an aperture formed therein;
   a plurality of portable curvilinear bars, each of said bars having a groove formed in an outer surface thereof and further being sized such that said bars removably penetrate through corresponding ones of said apertures of said tongues respectively;
   a plurality of portable cotter pins, said cotter pins being sized to removably and directly engage and maintain continuous contact within corresponding ones of said grooves of said bars, said cotter pins preventing said bars from undesirably and prematurely separating from said tongues of said rings during operating conditions; and
   a plurality of portable rectilinear rails removably connected to said rings, said rails being directly attached to the existing vehicle.

2. The anchoring system of claim 1, wherein each of said apertures has a centrally registered axis oriented parallel to said axis of said openings of said rings.

3. The anchoring system of claim 1, wherein each of said bars has a bend formed at a medial point thereof such that said bend and said cotter pins cooperate to prohibit said bars from exiting said apertures of said tongues and said rails respectively during operating conditions.

4. The anchoring system of claim 1, wherein selected ones of said rings have a plurality of tabs monolithically formed therewith and extending outwardly from said outer perimeter of each of said selected rings, said tabs being provided with a plurality of spaced arcuate shoulders formed along said outer perimeter of each of said selected rings, said tabs being spaced from said tongues and further being located diametrically opposite to each other along said outer perimeter of each of said selected rings.

5. The anchoring system of claim 1, wherein each of said rails further comprises:
   a plurality of openings formed therein, said rail openings being equidistantly spaced along an entire longitudinal length of each of said rails, each of said rail openings having a centrally registered axis oriented at a right angle to a longitudinal length of said rail, said bars penetrating through corresponding first and second ones of said rail openings wherein said grooves remain situated subjacent to a top surface of each of said rails; and
   a plurality of slots formed in said top surface of said rails and spaced therealong, each of said slots having a longitudinal length oriented parallel to said longitudinal length of said rails, each of said slots receiving corresponding ones of said tongues of said rings therein such that said respective apertures of said tongues align with corresponding ones of said first and second openings of said rails so that said bars penetrate through corresponding ones of said apertures of said tongues and said openings of said rails.

6. The anchoring system of claim 5, wherein said groove extends along an entire circumference of a respective said bar, said groove being oriented perpendicular to a longitudinal length of said bar, said bar having a first portion registered parallel to said top surface of a respective said rail, said bar further having a second portion extending outwardly from a lateral edge of said respective rail.

7. A cargo anchoring system for assisting a user to anchor cargo inside an existing vehicle or anchor safety chains to the existing vehicle, said anchoring system comprising:
   a plurality of portable anchor rings provided with a centrally registered opening formed therein, each of said rings having a tongue monolithically formed with an outer perimeter of said ring and extending outwardly therefrom, each of said tongues having planar top and bottom surfaces respectively oriented perpendicular to a centrally registered axis of a corresponding one of said ring openings, each of said tongues being provided with an aperture formed therein;
   a plurality of portable curvilinear bars, each of said bars having a groove formed in an outer surface thereof and further being sized such that said bars removably penetrate through corresponding ones of said apertures of said tongues respectively;

a plurality of portable cotter pins, said cotter pins being sized to removably and directly engage and maintain continuous contact within corresponding ones of said grooves of said bars, said cotter pins preventing said bars from undesirably and prematurely separating from said tongues of said rings during operating conditions;

a plurality of portable rectilinear rails removably connected to said rings, said rails being directly attached to the existing vehicle; and an anchor plate having laterally opposed edges directly coupled to inner surfaces of said rails, said anchor plate being centrally positioned between said rails and remaining statically affixed thereto, said anchor plate including a hitch protruding upwardly from a top surface thereof.

8. The anchoring system of claim 7, wherein each of said apertures has a centrally registered axis oriented parallel to said axis of said openings of said rings.

9. The anchoring system of claim 7, wherein each of said bars has a bend formed at a medial point thereof such that said bend and said cotter pins cooperate to prohibit said bars from exiting said apertures of said tongues and said rails respectively during operating conditions.

10. The anchoring system of claim 7, wherein selected ones of said rings have a plurality of tabs monolithically formed therewith and extending outwardly from said outer perimeter of each of said selected rings, said tabs being provided with a plurality of spaced arcuate shoulders formed along said outer perimeter of each of said selected rings, said tabs being spaced from said tongues and further being located diametrically opposite to each other along said outer perimeter of each of said selected rings.

11. The anchoring system of claim 7, wherein each of said rails further comprises:

a plurality of openings formed therein, said rail openings being equidistantly spaced along an entire longitudinal length of said rails, each of said rail openings having a centrally registered axis oriented at a right angle to a longitudinal length of said rail, said bars penetrating through corresponding first and second ones of said rail openings wherein said grooves remain situated subjacent to a top surface of each of said rails; and a plurality of slots formed in said top surface of said each of said rails and spaced therealong, each of said slots having a longitudinal length oriented parallel to said entire longitudinal length of respective ones of said rails, each of said slots receiving corresponding ones of said tongues of said rings therein such that said respective apertures of said tongues align with corresponding ones of said first and second openings of said rails so that said bars penetrate through corresponding ones of said apertures of said tongues and said openings of said rails.

12. The anchoring system of claim 11, wherein said groove extends along an entire circumference of a respective said bar, said groove being oriented perpendicular to a longitudinal length of said bar, said bar having a first portion registered parallel to said top surface of a respective said rail, said bar further having a second portion extending outwardly from a lateral edge of said respective rail.

* * * * *